(12) United States Patent
Patil et al.

(10) Patent No.: US 10,277,690 B2
(45) Date of Patent: Apr. 30, 2019

(54) CONFIGURATION-DRIVEN SIGN-UP

(71) Applicant: Microsoft Technology Licensing, LLC, Redmond, WA (US)

(72) Inventors: Madhura Patil, Redmond, WA (US); Sapan Sarvaiya, Redmond, WA (US); Biswa Ranjan Behera, Kirkland, WA (US); Fernanda Mendes Richnak, Redmond, WA (US); Matthew Jay Kotler, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 348 days.

(21) Appl. No.: 15/163,929

(22) Filed: May 25, 2016

(65) Prior Publication Data

US 2017/0346912 A1 Nov. 30, 2017

(51) Int. Cl.
*G06F 15/16* (2006.01)
*H04L 29/08* (2006.01)

(52) U.S. Cl.
CPC .............. *H04L 67/20* (2013.01); *H04L 67/18* (2013.01); *H04L 67/306* (2013.01)

(58) Field of Classification Search
CPC ......... H04L 67/20; H04L 67/02; H04L 67/18; H04L 67/306; G06F 3/0484
USPC ........................................ 709/201, 202, 203
See application file for complete search history.

(56) References Cited

U.S. PATENT DOCUMENTS

| 6,438,690 | B1 | 8/2002 | Patel et al. |
| 7,315,861 | B2 | 1/2008 | Seibel et al. |
| 7,356,560 | B2* | 4/2008 | Calinov .................. G06F 21/41 707/999.001 |
| 7,519,570 | B2 | 4/2009 | Wing et al. |

(Continued)

FOREIGN PATENT DOCUMENTS

WO 2002021896 A2 3/2002

OTHER PUBLICATIONS

Hug, et al., "Azure Active Directory B2C preview: Customize the Azure AD B2C user interface (UI)", Retrieved on: Mar. 2, 2016, 11pages. Available at: https://azure.microsoft.com/en-us/documentation/articles/active-directory-b2c-reference-ui-customization/.

(Continued)

*Primary Examiner* — Thu Ha T Nguyen
(74) *Attorney, Agent, or Firm* — Michael Best & Friedrich LLP (57) ABSTRACT

Systems and methods for conducting a sign-up process according to configuration data are presented. As indicated, the sign-up process is driven by configuration data, typically though not exclusively contained in an accessible configuration file, to conduct a sign-up process. According to the configuration data, the sign-up process utilizing the base set of executable code may conduct a sign-up process that includes presentation of data according to thematic elements, control the ordering of data aggregation and presentation, provide conditional branching among configuration items/instructions based on a variety of factors including user-provided input, validation of sign-up information including third-party validation of sign-up information, nesting sign-up processes, access to remotely located information, and external execution of functionality from or by external third-party services.

18 Claims, 5 Drawing Sheets

(56) References Cited

U.S. PATENT DOCUMENTS

| | | | |
|---|---|---|---|
| 2002/0052799 A1 | 5/2002 | Starikov | |
| 2002/0095651 A1* | 7/2002 | Kumar | G06F 9/547 717/104 |
| 2002/0133504 A1* | 9/2002 | Vlahos | G06F 17/30566 |
| 2005/0210379 A1 | 9/2005 | Weathersby et al. | |
| 2008/0005018 A1* | 1/2008 | Powell | G06Q 20/10 705/39 |
| 2008/0088428 A1* | 4/2008 | Pitre | G08B 25/016 340/506 |
| 2009/0197234 A1* | 8/2009 | Creamer | G09B 7/00 434/350 |
| 2009/0222907 A1* | 9/2009 | Guichard | G06F 21/6227 726/17 |
| 2010/0076863 A1* | 3/2010 | Golomb | G06F 17/3089 705/26.1 |
| 2012/0240206 A1* | 9/2012 | Hoffman | G06Q 30/0201 726/6 |
| 2013/0054678 A1* | 2/2013 | Williams | G06F 17/243 709/203 |
| 2013/0198027 A1* | 8/2013 | Anthonyson | G06Q 10/20 705/26.4 |
| 2014/0082155 A1 | 3/2014 | Abrams et al. | |
| 2014/0148102 A1* | 5/2014 | Hoffman | H04W 24/08 455/67.11 |
| 2014/0173405 A1 | 6/2014 | Ferrara et al. | |
| 2015/0046192 A1* | 2/2015 | Raduchel | H04W 8/18 705/3 |
| 2016/0072749 A1* | 3/2016 | Lu | H04L 51/12 709/206 |
| 2017/0093640 A1* | 3/2017 | Subramanian | H04L 41/12 |
| 2017/0221095 A1* | 8/2017 | Gauglitz | G06Q 10/10 |
| 2017/0222962 A1* | 8/2017 | Gauglitz | H04W 4/21 |
| 2017/0293610 A1* | 10/2017 | Tran | G06F 17/279 |
| 2017/0328728 A1* | 11/2017 | Salowitz | G01C 21/36 |
| 2017/0346912 A1* | 11/2017 | Patil | H04L 67/20 |

OTHER PUBLICATIONS

Ableson, Frank, "Build dynamic user interfaces with Android and XML", Published on: Sep. 7, 2010, 37 pages. Available at: http://www.ibm.com/developerworks/xml/tutorials/x-andddyntut/.

* cited by examiner

CONFIGURATION-DRIVEN SIGN-UP

BACKGROUND

Nearly every new application or app that a computer user now installs on a computing device, or online service to which the computer user subscribes, will require some form of sign-up and/or registration. Sometimes a sign-up process for an app from an app store can be handled by the computer system, i.e., the operating environment (or app store) may be configured to provide standard set of information like a user name, e-mail, default language, and the like. However, often for more sophisticated apps, applications and services, the sign-up process involves substantially more than standard information that is maintained by provider store. Indeed, apps, applications and/or online services may request personal information not typically available as "standard information" such as bank and/or credit card information, require status validation or verification, may request information conditioned upon various personal attributes, offer subscription and/or service options, and the like. Indeed, for these apps, applications and/or services, each must provide a sign-up process customized to the respective app or service.

Some software providers that offer multiple services may utilize thematic templates for making each sign-up process for each of the services have a general look and feel. These thematic templates may include common font and font sizes for textual elements, backgrounds and colors, spatial arrangements and the like. However, each of these apps or applications or online services includes its own copy of the sign-up/registration process: i.e., what information is presented to or requested from the computer user, the overall flow of the sign-up process, the validation of computer user eligibility status, and the like.

SUMMARY

The following Summary is provided to introduce a selection of concepts in a simplified form that are further described below in the Detailed Description. The Summary is not intended to identify key features or essential features of the claimed subject matter, nor is it intended to be used to limit the scope of the claimed subject matter.

According to aspects of the disclosed subject matter, systems and methods for conducting a sign-up process according to configuration data are presented. As indicated, the sign-up process is driven by configuration data, typically though not exclusively contained in an accessible configuration file, to conduct a sign-up process. According to the configuration data, the sign-up process utilizing the base set of executable code may conduct a sign-up process that includes presentation of data according to thematic elements, control the ordering of data aggregation and presentation, provide conditional branching among configuration items/instructions based on a variety of factors including user-provided input, validation of sign-up information including third-party validation of sign-up information, nesting sign-up processes, access to remotely located information, and external execution of functionality from or by external third-party services.

According to additional aspects of the disclosed subject matter, a computer-implemented method providing configuration driven sign-up is presented. The method includes receiving an instruction to commence a sign-up process of a computer user. Based on the instruction to commence the sign-up process, configuration data associated with the sign-up process is accessed. The configuration data comprises a plurality of configuration items, where each of the plurality of configuration items corresponds to one or more steps to be taken in/as part of the sign-up process. The configuration items are iteratively executed and sign-up data obtained in iteratively executing the configuration items is aggregated. The aggregated sign-up data is provided to a provider as part of the sign-up process.

According to further aspects of the disclosed subject matter, a computer-readable medium bearing computer-executable instructions is presented. The computer-executable instructions, when executed on a computing system comprising at least a processor, carry out a method for providing configuration driven sign-up. This method includes receiving an instruction to commence a sign-up process of a computer user. Based on the instruction to commence the sign-up process, configuration data associated with the sign-up process is accessed. The configuration data comprises a plurality of configuration items, where each of the plurality of configuration items corresponds to one or more steps to be taken in/as part of the sign-up process. The configuration items are iteratively executed and sign-up data obtained in iteratively executing the configuration items is aggregated. The aggregated sign-up data is provided to a provider as part of the sign-up process.

According to still further aspects of the disclosed subject matter, a computing device for conducting a sign-up process according to configuration data is presented. The computing device comprises a processor and a memory, wherein the processor executes instructions stored in the memory as part of or in conjunction with additional components to conduct the sign-up process. The additional components includes at least a executable installation agent. In execution, the installation agent accesses configuration data in regard to a sign-up process for a computer user. The configuration data includes a plurality of configuration items, each corresponding to one or more steps for carrying out the sign-up process. The installation agent iteratively executes one or more configuration items of the plurality of configuration items and, in executing the configuration items, aggregates the sign-up data obtained from executing the configuration items. The aggregated sign-up data is then provided to a service provider for which the sign-up process is executed.

BRIEF DESCRIPTION OF THE DRAWINGS

The foregoing aspects and many of the attendant advantages of the disclosed subject matter will become more readily appreciated as they are better understood by reference to the following description when taken in conjunction with the following drawings, wherein.

DETAILED DESCRIPTION

For purposes of clarity and definition, the term "exemplary," as used in this document, should be interpreted as serving as an illustration or example of something, and it should not be interpreted as an ideal or a leading illustration of that thing. Stylistically, when a word or term is followed by "(s)", the meaning should be interpreted as indicating the singular or the plural form of the word or term, depending on whether there is one instance of the term/item or whether there is one or multiple instances of the term/item. For example, the term "user(s)" should be interpreted as one or more users.

It should be appreciated that while the disclosed subject matter is applicable to applications (i.e., a computer-executable program designed to perform a group of coordinated functions, tasks, or activities for the benefit of a computer user), apps (i.e., a small, specialized application typically having a single or limited set of functionality, often designed for execution on computing devices of limited capacity and/or bandwidth), and/or online services, for purposes of simplicity in presentation of the disclosed subject matter the term "application" will be generally used.

Advantageously and in accordance with aspects of the disclosed subject matter, rather than configuring each individual app or application or online service with specific executable code to meet the needs of the sign-up process, these executable modules may, instead, utilize a base set of executable code that is driven by configuration data, typically though not exclusively contained in an accessible configuration file, to conduct a sign-up process. According to the configuration data, a sign-up process utilizing the base set of executable code may provide a sign-up process that includes thematic elements, control the ordering of data aggregation, provide conditional branching based on a variety of factors including user-provided input, sign-up information validation including third-party validation of sign-up information, nesting sign-up processes, access to remotely located information, and external execution of functionality from or by external third-party services.

Figure 1A:
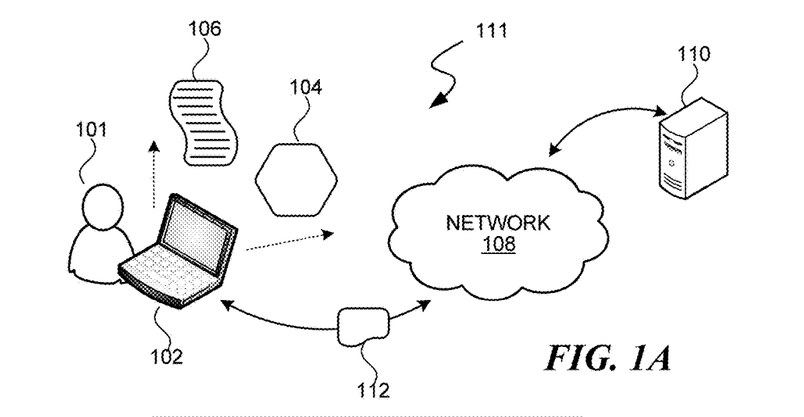
FIGS. 1A-1C are pictorial diagrams illustrating exemplary configurations for implementing aspects of the disclosed subject matter, particularly in regard to implementations of configuration-driven sign-up processes.
Figure 1B:
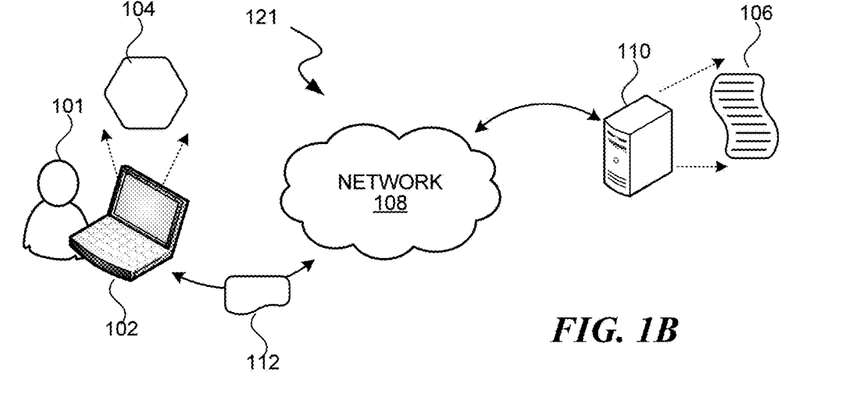
Figure 1C:
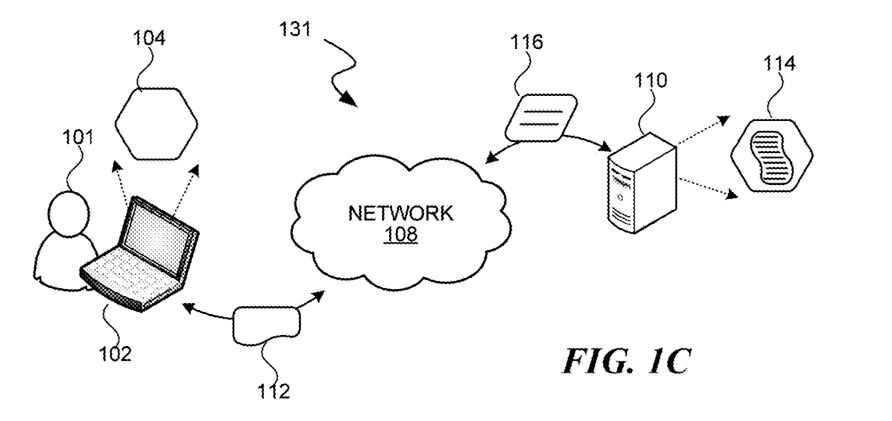

Turning now to the Figures, FIGS. 1A-1C are pictorial diagrams illustrating exemplary configurations for implementing aspects of the disclosed subject matter, particularly in regard to implementations of configuration-driven sign-up processes. In regard to FIG. 1A, this figure illustrates a first configuration 111 in which a computer user 101 executes a sign-up process 104 on a user computing device 102 in regard to an application. In this particular configuration 111, also available on the user computing device 102 is a configuration file 106 of configuration data comprising one or more configuration items for carrying out a specific process for the application. Each of the configuration items represent tasks for execution by the sign-up process for the application. As will be discussed more below, at the completion of executing the sign-up process, the sign-up data 112 obtained during the sign-up process as a result of carrying out the configuration items is aggregated and may be submitted over a network 108 to an software provider 110 of the application as part of the registration process (which may be a configuration item executed as part of the configuration file 106).

While configuration 111 illustrates that the configuration file 106 is located at the user computing device 102, in an alternative, second configuration 121 of FIG. 1B, the configuration file may alternatively be located at a remote location, such as reside at the software provider 110. In this embodiment, as part of the sign-up process 104, the configuration file 106 is retrieved from the software provider 110 as an initial step of the sign-up process.

In contrast to the first and second configurations, in a third configuration 131, the configuration file is hosted by the software provider 110 and accessible via one or more API 114 (application programming interface) calls to the software provider. In this configuration, the sign-up process 104 may repeatedly make calls on the software provider's API 114 and, in return, configuration items such as configuration items 116 are returned and carried out by the sign-up process on the user's computing device 102.

Of course, while FIGS. 1A-1C describe various system configurations, 111, 121 and 131, suitable for implementing one or more aspects of the disclosed subject matter, it should be appreciated that there may be other configurations in which a sign-up process, configured according to the disclosed subject matter, may be implements. Accordingly, the system configurations shown in these figures should be viewed as illustrative and not limiting upon the disclosed subject matter.

Figure 2:
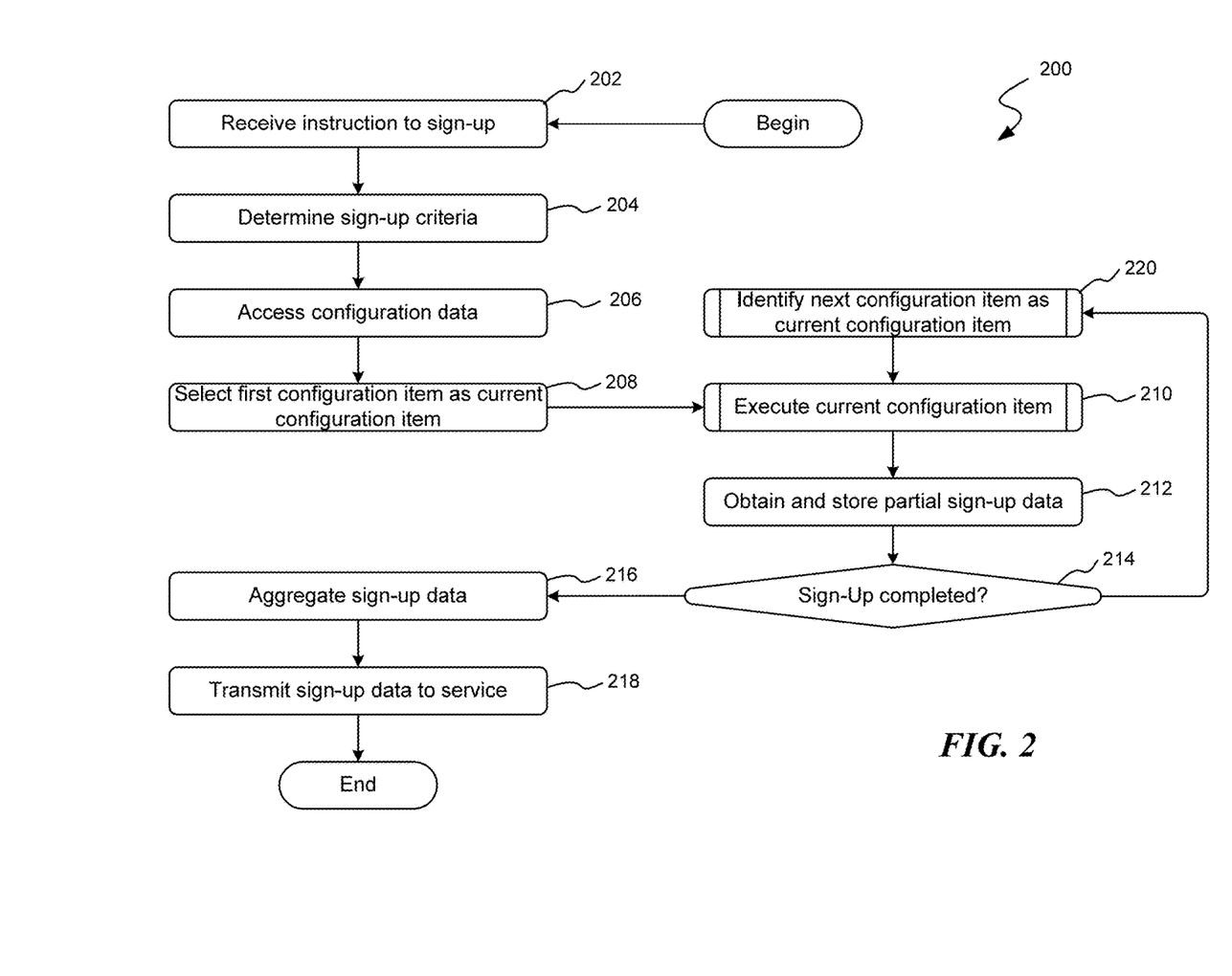
FIG. 2 is a flow diagram illustrating an exemplary routine suitable for implementing aspects of the disclosed subject matter, particularly in regard to a sign-up process.

FIG. 2 is a flow diagram illustrating an exemplary routine suitable for implementing aspects of the disclosed subject matter, particularly in regard to a sign-up process. Beginning at block 202, an instruction to sign-up to an application (or service or app) is received. According to aspects of the disclosed subject matter, the instruction to sign-up may be based on the computer user navigating a browser to a particular web page, or by the execution of an application (or other service) that requires sign-up to continue use, or by a third party to initiate sign-up with an application by the user. Correspondingly, at block 205, sign-up criteria regarding the instruction to sign-up is determined. The sign-up criteria may include, by way of illustration and not limitation, the URL/web site from which the instruction is received, the domain/domain type from which an instruction to sign-up is received or otherwise utilized by the computer user (e.g., an instruction from a ".edu" domain may signal eligibility to certain sign-up options), a particular offer that is made in regard to the sign-up (e.g., providing certain benefits and/or options not otherwise available), the geo-location of the user initiating the sign-up process (e.g., a person of country A may be required to provide certain information, or receive certain notifications, etc.), the language used by the computer user (as determined by the execution environment or personal settings), and the like. In short, the sign-up criteria may dictate not only the product or service to which the user is signing up, but also various options that used to control the sign-up process, e.g., determining the flow of information that is presented to the user, enhancing and/or restricting various options that would otherwise be available, what warnings/information/waivers must be presented to the user during sign-up, and the like.

At block 206, configuration data corresponding to the sign-up process, such as found in configuration file 106 of FIGS. 1A and 1B, or as obtained from a configuration service 114 of FIG. 1C, is obtained. From this configuration data and at block 208, a first configuration item is selected as a current configuration item to be executed, as part of iteration through the configuration items of the configuration data to carry out the steps of the sign-up process.

At block 210, the current configuration item is executed. According to aspects of the disclosed subject matter, executing the current configuration item may comprise any number of activities including, but not limited to: generating and/or presenting a common theme and/or thematic elements specified in the configuration data; obtaining data from the computer user; executing one or more segments of code;

conditional branching among configuration items according to computer user responses; interacting with third-party API's to execute a third-party function, and the like. Support for executing the current configuration item, as well as other configuration items, by way of illustration and not limitation, may be provided as an executable program or library of functionality installed or otherwise available on the user's computing device; as a library or set of executable scripts and/or code found within a web page, including a web page from which an instruction for conducting a sign-up originates; as external third-party services and/or API's (application programming interfaces) accessed over a network; and the like.

At block 212, any information that was made available through the execution of the current configuration item is obtained and stored as a portion of the sign-up data. At decision block 214, a determination is made as to whether the sign-up process is completed. The termination sign-up processes based on the configuration data, in particular whether according to the various responses of the computer user the sign-up process is completed. If the sign-up process is not completed, the routine 200 proceeds to block 220 where the next configuration item is selected as the current configuration item.

According to aspects of the disclosed subject matter, identifying a next configuration item may be based on information previously provided by the computer user, i.e., the current context of execution of the sign-up process. As indicated above, configuration data may include (by way of illustration and not limitation) conditional branching, nested sign-up processes (of other products and/or services) according to a second set of configuration data, validation processes including validation processes executed by external parties/services, and the like. Identifying a next configuration item may also be based on the sign-up criteria that was obtained in block 204 above. For example (by way of illustration and not limitation), based on the location in which the computer user is signing-up, a particular set of consumer rights and waivers may be required to be presented to the user such that the requested service may be legally provided. In another example (by way of illustration and not limitation), based on the origination from a college campus (e.g., an ".edu" domain), a validation step may be required to validate the computer user's qualification to enroll/sign-up with certain additional benefits or at a reduced rate, and this validation step may require the execution of validation code in which the computer user can demonstrate the necessary eligibility.

After identifying the next configuration item as the current configuration item, the routine proceeds back to block 210 for execution of the current configuration item.

Returning again to decision block 214, if the determination is made that the sign-up process is completed, the routine 200 proceeds to block 216. At block 216, the sign-up information that was obtained in part during the process is aggregated and, at block 216, the sign-up data (aggregated in the prior step) is transmitted as sign-up data to the sign-up service. Thereafter, routine 200 terminates.

Regarding routine 200, as well as other processes describe herein, while this routine/process is expressed in regard to discrete steps, these steps should be viewed as being logical in nature and may or may not correspond to any specific actual and/or discrete steps of a given implementation. Also, the order in which these steps are presented in the routine, unless otherwise indicated, should not be construed as the only order in which the steps may be carried out. Moreover, in some instances, some of these steps may be combined and/or omitted. Those skilled in the art will recognize that the logical presentation of steps is sufficiently instructive to carry out aspects of the claimed subject matter irrespective of any particular development or coding language in which the logical instructions/steps are encoded.

Of course, while this routine includes various novel features of the disclosed subject matter, other steps (not listed) may also be carried out in the execution of the subject matter set forth. Those skilled in the art will appreciate that the logical steps of this routine may be combined together or be comprised of multiple steps. Steps of the above-described routines may be carried out in parallel or in series. Often, but not exclusively, the functionality of the routine 200 is embodied in software (e.g., applications, system services, libraries, and the like) that is executed on one or more processors of computing devices, such as the computing devices described in regard FIG. 4 below. Additionally, in various embodiments all or some of the various routines may also be embodied in executable hardware modules including, but not limited to, system on chips (SoC's), codecs, specially designed processors and or logic circuits, and the like on a computer system.

As suggested above, this routine, as well as other processes described herein, are typically embodied within executable code modules comprising routines, functions, looping structures, selectors and switches such as if-then and if-then-else statements, assignments, arithmetic computations, and the like. However, as suggested above, the exact implementation in executable statement of each of the routines is based on various implementation configurations and decisions, including programming languages, compilers, target processors, operating environments, and the linking or binding operation. Those skilled in the art will readily appreciate that the logical steps identified in these routines may be implemented in any number of ways and, thus, the logical descriptions set forth above are sufficiently enabling to achieve similar results.

While many novel aspects of the disclosed subject matter are expressed in routines embodied within applications (also referred to as computer programs), apps (small, generally single or narrow purposed applications), and/or methods, these aspects may also be embodied as computer-executable instructions stored by computer-readable media, also referred to as computer-readable storage media, which are articles of manufacture. As those skilled in the art will recognize, computer-readable media can host, store and/or reproduce computer-executable instructions and data for later retrieval and/or execution. When the computer-executable instructions that are hosted or stored on the computer-readable storage devices are executed by a processor of a computing device, the execution thereof causes, configures and/or adapts the executing computing device to carry out various steps, methods and/or functionality, including those steps, methods, and routines described above in regard to the various illustrated routines. Examples of computer-readable media include, but are not limited to: optical storage media such as Blu-ray discs, digital video discs (DVDs), compact discs (CDs), optical disc cartridges, and the like; magnetic storage media including hard disk drives, floppy disks, magnetic tape, and the like; memory storage devices such as random access memory (RAM), read-only memory (ROM), memory cards, thumb drives, and the like; cloud storage (i.e., an online storage service); and the like. While computer-readable media may reproduce and/or cause to deliver the computer-executable instructions and data to a computing device for execution by one or more processors via various transmission means and mediums, including carrier waves and/or propagated signals, for purposes of this disclosure computer readable media expressly excludes carrier waves and/or propagated signals.

Figure 3:
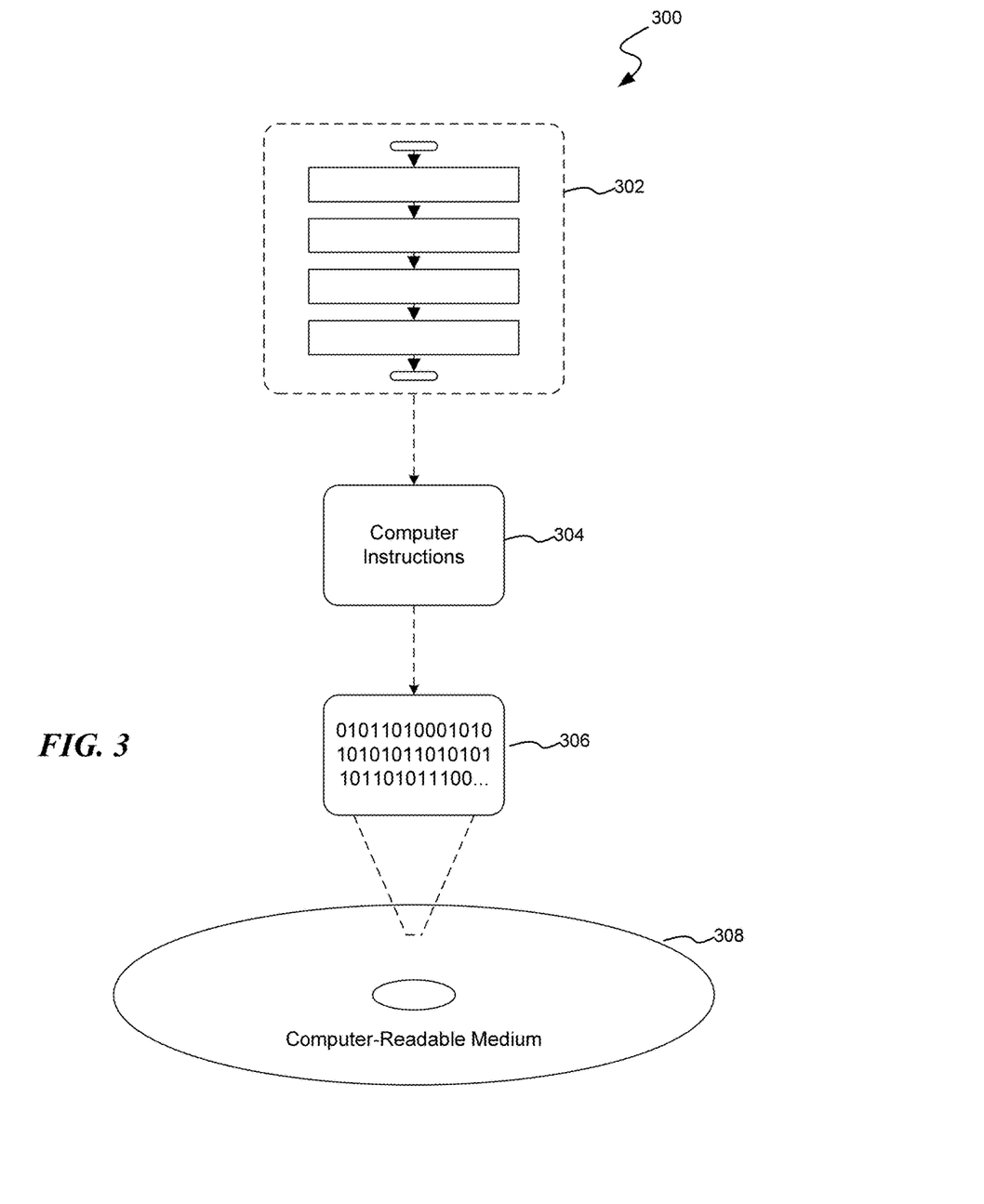
FIG. 3 is a block diagram illustrating an exemplary computer readable medium encoded with instructions.

Regarding the computer-readable media, FIG. 3 is a block diagram illustrating an exemplary computer readable medium encoded with instructions, such as those instructions found in routine 200, formed according to aspects of the disclosed subject matter. More particularly, the implementation 300 comprises a computer-readable medium 308 (e.g., a CD-R, DVD-R or a platter of a hard disk drive), on which is encoded computer-readable data 306. This computer-readable data 306 in turn comprises a set of computer instructions 304 configured to operate according to one or more of the principles set forth herein. In one such embodiment 302, the processor-executable instructions 304 may be configured to perform a method, such as at least some of the exemplary method 200 above, for example. In another such embodiment, the processor-executable instructions 304 may be configured to implement a system, such as the exemplary system 400, as described below. Many such computer-readable media may be devised, by those of ordinary skill in the art, which are configured to operate in accordance with the techniques presented herein.

Figure 4:
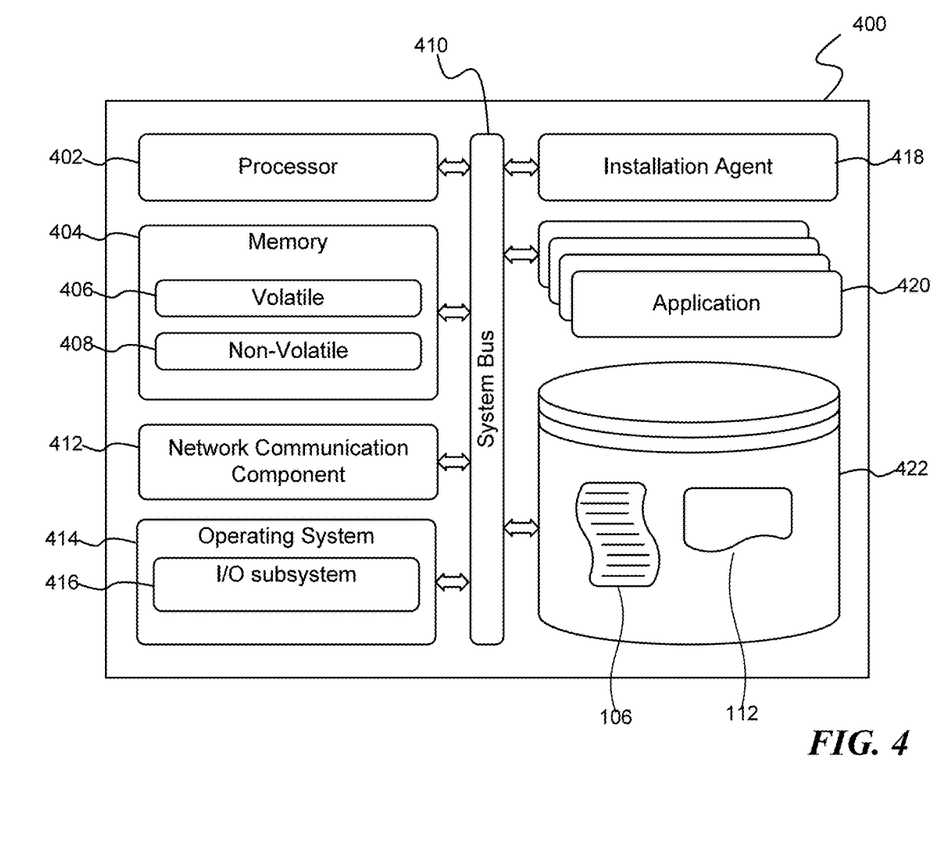
FIG. 4 is a block diagram illustrating an exemplary computing device suitable for implementing aspects of the disclosed subject matter, particularly in regard to a sign-up process.

FIG. 4 is a block diagram illustrating elements of an exemplary user computing device 400 suitable for implementing one or more aspects of the disclosed subject matter. While the exemplary user computing device 400 is described with regard to various illustrative elements and/or components, the various user computing devices that may be used to implement these aspects include, by way of illustration and not limitation, decktop computers, tablet computing devices, thin-clients to cloud services, mobile phones and the so-called "phablet" computing devices (hybrid phone/tablet devices), personal digital assistants, smart watches and other wearable computing devices, laptop computers, and the like.

The exemplary user computing device 400 includes one or more processors (or processing units), such as processor 402, and one or more memories, such as memory 404. The processor 402 and memory 404, as well as other components, are interconnected by way of a system bus 410. The memory 404 typically (but not always) comprises both volatile memory 406 and non-volatile memory 408. Volatile memory 406 retains or stores information so long as the memory is supplied with power. In contrast, non-volatile memory 408 is capable of storing (or persisting) information even when a power supply is not available. Generally speaking, RAM and CPU cache memory are examples of volatile memory 406 whereas ROM, solid-state memory devices, memory storage devices, and/or memory cards are examples of non-volatile memory 408.

As will be appreciated by those skilled in the art, the processor 402 executes instructions retrieved from the memory 404 (and/or from computer-readable media, such as computer-readable media 300 of FIG. 3) in carrying out various functions of sign-up process as described above. The processor 402 may be comprised of any of a number of available processors such as single-processor, multi-processor, single-core units, and multi-core units.

Further still, the illustrated user computing device 400 includes a network communication component 412 for interconnecting this computing device with other devices and/or services over a computer network, including computing systems hosting an instruction processing agent 118, such as computing system 116. The network communication component 412, sometimes referred to as a network interface card or NIC, communicates over a network (such as network 108 of FIG. 1A) using one or more communication protocols via a physical/tangible (e.g., wired, optical, etc.) connection, a wireless connection, or both. As will be readily appreciated by those skilled in the art, a network communication component, such as network communication component 412, is typically comprised of hardware and/or firmware components (and may also include or comprise executable software components) that transmit and receive digital and/or analog signals over a transmission medium (i.e., the network.)

The illustrated user computing device 400 also includes an operating system 414. As those skilled in the art will appreciate, an operating system is computing device software that manages the device's hardware and software resources, and that provides common services, sometimes called system services, for computer programs that execute on the computing device. An element of the operating system 414 is an I/O (input/output) subsystem 416. The I/O subsystem 416 provides the channels for communication between the computing device 400 and the "outside world," e.g., a human or another information computing device and/or system. For the I/O subsystem 416, inputs are the signals or data received by the computing device and outputs are the signals or data sent from it. The I/O subsystem 416 typically includes one or more user interfaces, such as output devices and input devices. Output devices may include, by way of illustration and not limitation, display screens, haptic output devices, audio devices, and the like. Input devices include, by way of illustration and not limitation, text input devices, touch devices, mouse and other pointing devices, NUI (natural user-interface) devices such as audio capture devices, video devices, and the like. By way of illustration and not limitation, a user, such as user 101, may issue a command to a user agent 104 via an audio capture device (e.g., a microphone).

Also included in the exemplary computing device 400 is an installation agent 418. The installation agent is configured to, upon execution, accept and/or access configuration data and execute a sign-up process according to the configuration data. As indicated above, execution of the sign-up process according to configuration data may include the presentation of thematic elements, conditional branching according to contextual data and/or information obtained from a computer user in the sign-up process, nesting of sign-up processes, execution of third-party services, validation of information provided by the computer user, execution of executable code provided as part of the configuration data, utilization of user information already stored regarding the user in a data store 422, and the like.

The exemplary computing device 400 may also include one or more applications and/or apps, such as application 420, which may require sign-up according to the disclosed subject matter to operate, as well as apps and/or applications that may be used as part of a sign-up process. The data store 422 may store one or more configuration files, such as configuration file 102, as well as sign-up data 112 obtained by one or more sign-up processes.

Regarding the various components of the exemplary computing device 400, those skilled in the art will appreciate that many of these components may be implemented as executable software modules stored in the memory of the computing device, as hardware modules and/or components (including SoCs—system on a chip), or a combination of the two. Indeed, components may be implemented according to various executable embodiments including executable software modules that carry out one or more logical elements of the processes described in this document, or as a hardware and/or firmware components that include executable logic to carry out the one or more logical elements of the processes described in this document. Examples of these executable hardware components include, by way of illustration and not limitation, ROM (read-only memory) devices, programmable logic array (PLA) devices, PROM (programmable read-only memory) devices, EPROM (erasable PROM) devices, and the like, each of which may be encoded with instructions and/or logic which, in execution, carry out the functions described herein.

Moreover, in certain embodiments each of the various components of the various computing device 400 may be implemented as an independent, cooperative process or device, operating in conjunction with or on one or more computer systems and or computing devices. It should be further appreciated, of course, that the various components described above should be viewed as logical components for carrying out the various described functions. As those skilled in the art will readily appreciate, logical components and/or subsystems may or may not correspond directly, in a one-to-one manner, to actual, discrete components. In an actual embodiment, the various components of each computing device may be combined together or distributed across multiple actual components and/or implemented as cooperative processes on a computer network, such as network 108 of FIG. 1A.

Figure 5:
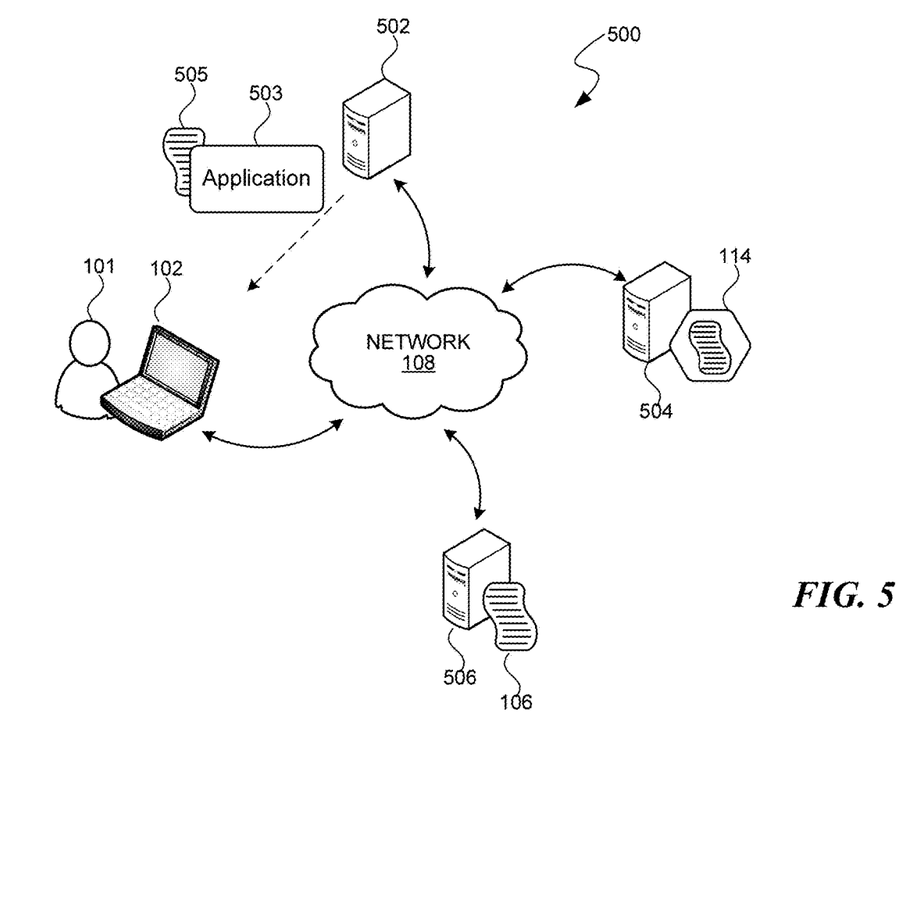
FIG. 5 is a pictorial diagram illustrating an exemplary network environment 500 suitable for implementing aspects of the disclosed subject matter.

FIG. 5 is a pictorial diagram illustrating an exemplary network environment 500 suitable for implementing aspects of the disclosed subject matter, including various embodiments of sign-up processes/services. As shown in FIG. 5, the exemplary network environment 500 includes one or more user computing devices, such as user computing device 102, each associated with a computer user, i.e., user 101. User computing devices, including user computing device 102 and other computing devices such as computing device 502-506 are interconnected by way of a network 108. As those skilled in the art will appreciate, a computer network or data network (referred to as "network" throughout this document by way of shorthand description) is a telecommunications network which allows networked computing devices (computing devices communicatively connected to the network) to exchange data. In computer networks, networked computing devices exchange data with each other along network links (data connections). The connections between nodes are established using either wired and/or wireless connections. While, perhaps, the best-known computer network is the Internet, sometimes also referred to as the "Web," the disclosed subject matter is not limited to operation solely on the Internet.

As shown in the exemplary network environment 500, by way of illustration and not limitation, included is a computing device 502 representing a software (or service) provider that may provide an application 503 (including a configuration file 505) to the computer user for which a sign-up process is needed. Also illustrated in the exemplary network environment 500 is computing device 504 representing a software (or service) provider that provides an online service for the computer user that requires a sign-up process, and further includes an API 114 by which the computer user obtains configuration data by which the sign-up process is completed. Still further shown in the exemplary network environment is computing device 506 representing a software (or service) provider that maintains a configuration file 106 for execution at the time of sign-up for an app, application, and/or online service.

Of course, which the exemplary network environment 500 illustrates various software/service providers, it should be viewed as illustrative of the many and various configurations in which a computer user may obtain information for executing a sign-up process according to aspects of the disclosed subject matter.

While various novel aspects of the disclosed subject matter have been described, it should be appreciated that these aspects are exemplary and should not be construed as limiting. Variations and alterations to the various aspects may be made without departing from the scope of the disclosed subject matter.

What is claimed:

1. A computer-implemented method providing configuration driven sign-up, the method comprising:
   receiving, with an installation agent installed on a computing device of a user, an instruction to commence a first sign-up process of the user for a first applications;
   accessing, with the installation agent, first configuration data associated with the first sign-up process, wherein the first configuration data comprises a first plurality of configuration items, and wherein the first plurality of configuration items correspond to steps to be taken in the first sign-up process for the first application;
   iteratively executing, with the installation agent, configuration items of the first plurality of configuration items;
   aggregating first sign-up data obtained in iteratively executing the configuration items of the first plurality of configuration item;
   providing the first aggregated sign-up data to a first service provider associated with the first application;
   receiving, with the installation agent installed on the computing device of the user, an instruction to commence a second sign-up process of the user for a second application;
   accessing, with the installation agent, second configuration data associated with the second sign-up process for the second application, wherein the second configuration data comprising a second plurality of configuration items, and wherein the second plurality of configuration items correspond to steps to be taken in the second sign-up process for the second application;
   iteratively executing, with the installation agent, configuration items of the second plurality of configuration items;
   aggregating second sign-up data obtained in iteratively executing the configuration items of the second plurality of configuration items; and
   providing the aggregated second sign-up to the first service provider or a second service provider associated with the second application.

2. The computer-implemented method of claim 1, further comprising determining sign-up criteria in regard to receiving the instruction to commence the first sign-up process.

3. The computer-implemented method of claim 2, wherein iteratively executing configuration items of the first plurality of configuration items comprises iteratively identifying a next configuration item of the first plurality of configuration items to execute.

4. The computer-implemented method of claim 3, wherein iteratively identifying a next configuration item of the first plurality of configuration items to execute comprises iteratively identifying a next configuration item of the first plurality of configuration items according to the sign-criteria.

5. The computer-implemented method of claim 3, wherein the sign-up criteria comprises any one or more of: a geo-location of the user; a URL from where the first sign-up process was initiated; a domain utilized by the user;

an offer associated with the first sign-up process; and a language utilized by the user.

6. The computer-implemented method of claim 1, wherein iteratively executing the configuration items of the first plurality of configuration items is carried out through a set of API's (application programming interfaces) of an external third-party service to the computing device.

7. The computer-implemented method of claim 1, wherein at least one of the first plurality of configuration items includes any one or more of: a conditional branching instruction from a first configuration item to one of at least two other configuration items based on user responses; presentation of information according to thematic elements specified in the first configuration data; a nested sign-up process for another product according to third configuration data; a validation step for validating at least some of the information provided by the user during the iterative execution of the first plurality of configuration items; and the execution of a third-party function via a third-party API (application programming interface).

8. The computer-implemented method of claim 7, wherein the validation step is executed by an external service.

9. A computer-readable medium bearing computer-executable instructions which, when executed on a computing device of a user, the computing device comprising at least a processor, carry out a method for providing configuration driven sign-up, the method comprising:
receiving an instruction to commence a first sign-up process of the user for a first online service;
accessing first configuration data associated with the sign-up process, wherein the first configuration data comprises a first plurality of configuration items, and wherein the first plurality of configuration items correspond to steps to be taken in the first sign-up process for the first online service;
iteratively executing configuration items of the first plurality of configuration items;
aggregating first sign-up data obtained in iteratively executing the configuration items of the first plurality of configuration items;
providing the aggregated first sign-up data to a first service provider associated with the first online service;
receiving an instruction to commence a second sign-up process of the user for a second online service;
accessing second configuration data associated with the second sign-up process for the second application, wherein the second configuration data comprising a second plurality of configuration items, and wherein the second plurality of configuration items correspond to steps to be taken in the second sign-up process for the second online service;
iteratively executing configuration items of the second plurality of configuration items;
aggregating second sign-up data obtained in iteratively executing the configuration items of the second plurality of configuration items; and
providing the aggregated second sign-up to the first service provider or a second service provider associated with the second online service.

10. The computer-readable medium of claim 9, wherein the method further comprises determining sign-up criteria in regard to receiving the instruction to commence the first sign-up process.

11. The computer-readable medium of claim 10, wherein iteratively executing configuration items of the first plurality of configuration items comprises iteratively identifying a next configuration item of the first plurality of configuration items to execute.

12. The computer-readable medium of claim 11, wherein iteratively identifying a next configuration item of the first plurality of configuration items to execute comprises iteratively identifying a next configuration item of the first plurality of configuration items according to the sign-up criteria.

13. The computer-readable medium of claim 12, wherein the sign-up criteria comprises any one or more of: a geo-location of the user; a URL from where the first sign-up process was initiated; a domain utilized by the user; an offer associated with the first sign-up process; and a language utilized by the user.

14. The computer-readable medium of claim 9, wherein executing the configuration items of the first plurality of configuration items is carried out by a set of API's (application programming interfaces) of an external third-party service to the computing device.

15. The computer-readable medium of claim 9, wherein at least one of the first plurality of configuration items includes any one or more of: a conditional branching instruction among the first plurality of configuration items based on user responses; presentation of information according to thematic elements specified in the first configuration data; a nested sign-up process for another product according to third configuration data; a validation step for validating at least some of the information provided by the user during the iterative execution of the first plurality of configuration items; and the execution of a third-party function via a third-party API (application programming interface).

16. A computing device for conducting sign-up processes for a user of the computing device according to configuration data, the computing device comprising a processor and a memory, wherein the processor executes instructions stored in the memory as part of or in conjunction with additional components to conduct the sign-up processes, wherein the additional components comprise:
an executable installation agent, wherein in execution on a computing device, the installation agent:
accesses first configuration data comprising a first plurality of configuration items in regard to a first sign-up process for the user for a first product;
iteratively executes configuration items of the first plurality of configuration items;
aggregates first sign-up data obtained in iteratively executing the configuration items of the first plurality of configuration items;
provides the aggregated first sign-up data to a first service provider for which the first sign-up process is executed;
accesses second configuration data comprising a second plurality of configuration items in regard to a second sign-up process for the user for a second product;
iteratively executes configuration items of the second plurality of configuration items;
aggregates second sign-up data obtained in iteratively executing the configuration items of the second plurality of configuration items; and
provides the aggregated second sign-up data to the first service provider or a second service provider for which the second sign-up process is executed.

17. The computing device of claim 16, wherein a configuration item of the first plurality of configuration items includes any one or more of: a conditional branching instruction that conditionally branches from a first configuration item to one of at least two other configuration items based on user responses; a presentation instruction that presents information according to thematic elements specified in the configuration data; a nested sign-up instruction that executes the first sign-up process of a third product according to third configuration data; a validation instruction that validates at least some of the information provided by the user during the iterative execution of the first plurality of configuration items; and a third-party execution instruction that executes a third-party function via a third-party API (application programming interface).

18. The computing device of claim 16, wherein the first product includes at least one of an application and an online service and wherein the second product includes at least one of an application and an online service.

\* \* \* \* \*